(12) United States Patent
Zhao et al.

(10) Patent No.: US 8,880,927 B2
(45) Date of Patent: Nov. 4, 2014

(54) TIME SYNCHRONIZATION METHOD AND SYSTEM FOR MULTICORE SYSTEM

(75) Inventors: Yang Zhao, Shenzhen (CN); Li Xiao, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 829 days.

(21) Appl. No.: 13/061,748

(22) PCT Filed: Aug. 27, 2009

(86) PCT No.: PCT/CN2009/073574
§ 371 (c)(1),
(2), (4) Date: Apr. 18, 2011

(87) PCT Pub. No.: WO2010/025656
PCT Pub. Date: Mar. 11, 2010

(65) Prior Publication Data
US 2011/0185216 A1    Jul. 28, 2011

(30) Foreign Application Priority Data

Sep. 2, 2008    (CN) .......................... 2008 1 0142169

(51) Int. Cl.
*G06F 1/12*    (2006.01)
*G06F 13/42*    (2006.01)

(52) U.S. Cl.
USPC ............ 713/401; 713/375; 713/400; 370/503

(58) Field of Classification Search
USPC .......................... 713/400, 401, 375; 370/503
See application file for complete search history.

(56) References Cited

U.S. PATENT DOCUMENTS

| 6,952,789 | B1 * | 10/2005 | Azim et al. ................... 713/400 |
| 2005/0033947 | A1 * | 2/2005 | Morris et al. ..................... 713/1 |
| 2005/0210465 | A1 * | 9/2005 | Sasaki et al. .................. 717/175 |

FOREIGN PATENT DOCUMENTS

| CN | 1949129 A | 4/2007 |
| CN | 101359238 A | 2/2009 |
| GB | 2404761 A | 2/2005 |

* cited by examiner

*Primary Examiner* — Michael J Brown
(74) *Attorney, Agent, or Firm* — McClure, Qualey & Rodack, LLP (57) ABSTRACT

A time synchronization method and system for a multi-core system are provided. The time synchronization method comprises: establishing at least one clock synchronization domain, and respectively allocating each core to each clock synchronization domain; selecting a core with a lowest load in each clock synchronization domain as a master clock synchronization source in the clock synchronization domain, and selecting the clock synchronization domain having the master clock synchronization source with a lowest load as a master clock synchronization domain, while other clock synchronization domains as slave clock synchronization domains; the master clock synchronization domain sending a synchronization deviation detection message to each slave clock synchronization domain, and calculating a time deviation value; when the time deviation value is greater than a permitted deviation value, the master clock synchronization domain calculating a time adjustment quantity and releasing to each slave clock synchronization domain, making adjustment based on its time adjustment quantity.

14 Claims, 3 Drawing Sheets

TIME SYNCHRONIZATION METHOD AND SYSTEM FOR MULTICORE SYSTEM

CROSS REFERENCE RELATED APPLICATIONS

This application is a national phase of PCT/CN2009/073574 filed Aug. 27, 2009 which claims priority to China Application Serial No. 200810142169.5, filed Sep. 2, 2008, both of which are entirely incorporated herein by reference.

TECHNICAL FIELD

The present invention relates to the field of multi-core processor, and in particular, to a time synchronization method and system for a multi-core system.

BACKGROUND ART

Generally, only a single embedded operating system can be operated in a single-core embedded processor system, and during operation of the system, the most crucial system clock interrupt is implemented by converting the time interval of timer interrupt into a specific value, submitting the timer interrupt to the core when the number of a core hardware counter accumulates up to the value of the time interval, and automatically re-loading the counter by the processor; considering that the interval of the timer interrupt should not be too short, the interval of timer interrupt configured in the system is generally set as 10 ms-100 ms, and once a clock interrupt occurs, the system enters a timer interrupt service procedure, ticks (clock tick, which is a relative time unit of the system derived from the periodical interrupt of the timer, one interrupt represents one tick) of the system are accumulated and task scheduling of the operating system is performed.

In a single-core processor, the requirements for synchronization of clock ticks are not high, for example, two software timers are set, the relative interval between timers will not change obviously even if the clock tick interrupt is lost since time deviation is relative to one hardware timer standard, which, therefore, will not have great impact on the service.

Figure 1:
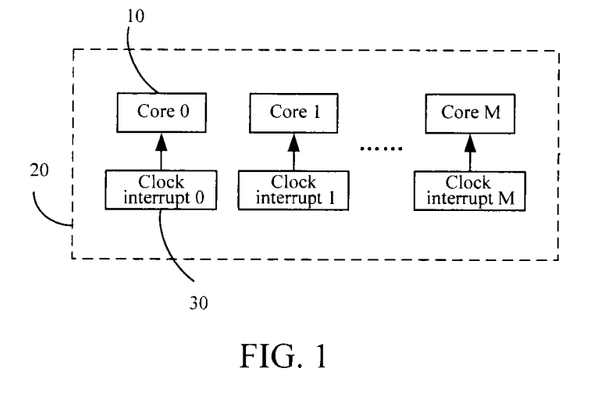
FIG. 1 illustrates the application of the existing multi-core system.

Nevertheless, in a multi-core processing system, the number of cores is increasing continuously with the development of technology, two cores, four cores, eight cores, and sixteen cores have become the main trend of various application development. Multi-core and multi-thread technology also develops very fast, a single chip containing 64 or more cores will arise in the coming years, and the expansion of the scale of the system has higher requirements on the clock synchronization. When a multi-core system operates a plurality of embedded operating systems, for example, each core separately operates embedded operating systems such as vxWorks and Linux, as shown in FIG. 1, each core 10 in a multi-core system 20 separately implements the function of system clock counting through the clock interrupt 30. Due to reasons like unbalance of operation load of each core, the system clock tick of the embedded operating system operated on each core cannot keep synchronous with each other, on the contrary, the system clock ticks of different cores will have a large deviation with the increase of operating time of the system. Since an upper-layer software timer is generally set based on the system clock tick, such a deviation, if up to a certain point, will have a strong impact on the accuracy and synchronization of upper-layer application software timers between different cores. For example, it is assumed that the tick of each clock interrupt in the operating system is 10 ms, if a timer with a duration of 10000 ticks is set in an operating system of a plurality of cores, load unbalance of a certain core will also cause loss of the clock interrupt of the core, thus causing ticks to have a deviation. When the accumulated deviation between clock ticks of different cores reaches 5 ticks, namely 50 ms, this will not be tolerable in some applications sensitive to time.

SUMMARY OF THE INVENTION

In view of the above, the present invention provides a time synchronization method and system for a multi-core system, which can effectively achieve clock synchronization of a multi-core system and ensure reliability and stability of system operation.

In order to solve the above technical problem, the present invention adopts the following technical solution:

A time synchronization method for a multi-core system, comprising the following steps of:

A, establishing at least one clock synchronization domain, and respectively allocating each core of the multi-core system to each clock synchronization domain;

B, selecting a core with a lowest load in each clock synchronization domain as a master clock synchronization device in the clock synchronization domain, and other cores as slave clock synchronization devices in the clock synchronization domain; selecting the clock synchronization domain having the master clock synchronization device with a lowest load among various master clock synchronization devices as a master clock synchronization domain, while other clock synchronization domains as slave clock synchronization domains;

C, the master clock synchronization domain sending a synchronization deviation detection message to each slave clock synchronization domain, and calculating a time deviation value between each slave clock synchronization domain and the master clock synchronization domain;

D, when the time deviation value is greater than a permitted deviation value, the master clock synchronization domain calculating a time adjustment quantity of each slave clock synchronization domain and releasing the time adjustment value to each slave clock synchronization domain, and each slave clock synchronization domain making adjustment based on its time adjustment quantity, thereby completing clock synchronization.

Furthermore, said step B further comprises:

selecting a core with a second lowest load in each clock synchronization domain as a standby clock synchronization device in the clock synchronization domain, and when a core load of the master clock synchronization device is higher than that of the standby clock synchronization device or the master clock synchronization device is abnormal, switching the master clock synchronization device with the standby clock synchronization device.

Preferably, said step C specifically comprises:

C1, constructing the master clock synchronization domain and each slave clock synchronization domain into an annular synchronization network, and each slave clock synchronization domain registering at the master clock synchronization domain;

C2, the master clock synchronization domain sending the synchronization deviation detection message, the synchronization deviation detection message flowing through each clock synchronization domain in a sequence of registering of each clock synchronization domain and then returning to the master clock synchronization domain, and each slave clock synchronization domain returning its own relative time deviation to the synchronization deviation detection message, wherein the relative time deviation refers to a time deviation of each slave clock synchronization domain relative to a last slave clock synchronization domain in a flow direction of the synchronization deviation detection message;

C3, the master clock synchronization domain calculating a time deviation value between each slave clock synchronization domain and the master clock synchronization domain according to the returned synchronization deviation detection message. Wherein, in said step C, the master clock synchronization domain sends the synchronization deviation detection message to each slave clock synchronization domain in a periodical manner.

Furthermore, the adjusting step in said step D further comprises:

weighted averaging the absolute value of the time adjustment quantity of each slave clock synchronization domain for a number of times in a predetermined range;

determining a priority level of each slave clock synchronization domain according to a result of the weighted averaging; and allowing each slave clock synchronization device to adjust among each slave clock synchronization domain according to time accuracy of a core application, adjusting a slave clock synchronization device having a high requirement on time accuracy to a slave clock synchronization domain with a high priority level, and adjusting a slave clock synchronization device having a low requirement on time accuracy to a slave clock synchronization domain with a low priority level.

Furthermore, if any core is newly added, the newly added core is added to a clock synchronization domain with a corresponding priority level, and if a number of newly added cores is greater than a device accommodating threshold of a time clock synchronization domain with a corresponding priority level, then the clock synchronization domain is split.

The time synchronization method, the load of a core is calculated as follows:

determining core load calculation associated factors, said core load calculation associated factors including current occupancy rate of the core, core load history, type of an articulated interrupt device of the core, a number of articulated interrupt sources of the core and type of application of the core; and selecting at least one of the core load calculation associated factors for weighted operation, and using a result of the weighted operation as the load of the core.

Said time synchronization method, further comprises system clock tick monitoring processing:

the master time synchronization device of the master time synchronization domain at least sampling system ticks twice during each system tick interval, and accumulating sampling values of system ticks;

judging whether system ticks are lost according to a predetermined principle, and if yes, modifying a current system tick value.

The present invention further discloses a time synchronization system for a multi-core system, comprising at least one clock synchronization domain, wherein the time synchronization system is configured as follows:

each core in the multi-core system being allocated respectively to each clock synchronization domain, a core with a lowest load in each clock synchronization domain being selected as a master clock synchronization device in the clock synchronization domain, and other cores being selected as slave clock synchronization devices in the clock synchronization domain; the clock synchronization domain having the master clock synchronization device with a lowest load among various master clock synchronization devices being selected as a master clock synchronization domain, while other clock synchronization domains being selected as slave clock synchronization domains;

the master clock synchronization domain sending a synchronization deviation detection message to each slave clock synchronization domain, and calculating a time deviation value between each slave clock synchronization domain and the master clock synchronization domain, and when the time deviation value is greater than a permitted deviation value, the master clock synchronization domain calculating a time adjustment quantity of each slave clock synchronization domain and releasing the time adjustment value to each slave clock synchronization domain.

The time synchronization system, wherein, the master clock synchronization domain is exteriorly connected with an exterior synchronization source.

In the present invention, time synchronization domains are divided in a multi-core system, a master clock synchronization domain is used as a controlling and managing domain for all clock synchronization domains, therefore processing load of the system can be balanced, thereby avoiding processing delay of the system software caused by expansion of the operating scale, and the deviation of an upper-layer software timer caused by increase of operating time of the system is adjusted, thus effectively achieving clock synchronization of the multi-core system and improving the reliability and stability of system operation.

PREFERRED EMBODIMENTS OF THE INVENTION

The present invention will be described in detail below with reference to drawings and specific embodiments.

Figure 2:
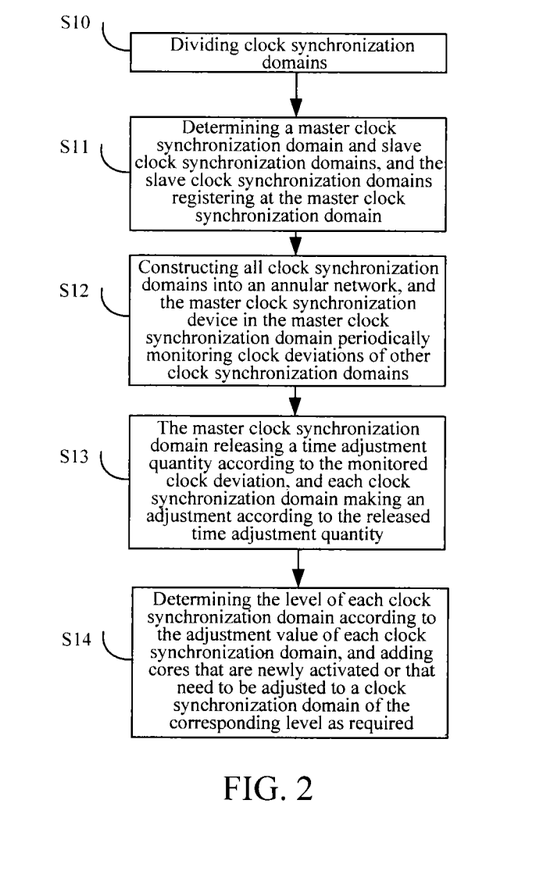
FIG. 2 illustrates dividing of the time synchronization domains in a multi-core system according to a specific embodiment of the present invention.

Specific embodiments of the present invention are shown in FIGS. 2-5, and as shown in FIG. 2, the time synchronization method according to a specific embodiment of the present invention mainly comprises the following steps:

S10, firstly dividing clock synchronization domains, and uniquely allocating each core to each clock synchronization domain;

S11, determining a master clock synchronization domain and slave clock synchronization domains, and the slave clock synchronization domains sending a registering message to the master clock synchronization domain;

S12, constructing all clock synchronization domains into an annular network, and the master clock synchronization device of the master clock synchronization domain periodically monitoring clock deviations of other clock synchronization domains;

S13, when it is necessary to make an adjustment, the master clock synchronization domain releasing a time adjustment quantity to each slave clock synchronization domain; and S14, determining the level of each clock synchronization domain according to the adjustment value of each clock synchronization domain, and adding cores that are newly activated or that need to be adjusted according to the practical circumstance to a clock synchronization domain of the corresponding level as required.

Figure 3:
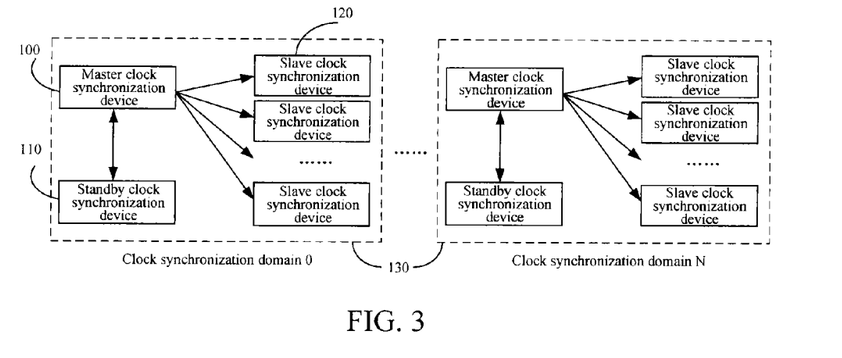
FIG. 3 illustrates time synchronization networking in a multi-core system according to a specific embodiment of the present invention.

The above steps will be described in detail below:

The first step, one or more clock synchronization domains are established in a multi-core system, each core in the multi-core system is uniquely allocated to a certain clock synchronization domain, and a master clock synchronization device and slave clock synchronization devices are determined in each clock synchronization domain; furthermore, a standby clock synchronization device may also be determined, and the master clock synchronization device and standby clock synchronization device can be a back-up for each other, which improves the reliability of synchronization. The initial allocation of each core in the clock synchronization domain may be carried out randomly among cores, or may be carried out based on correlation of application of each core. As shown in FIG. 3, each core is allocated to the clock synchronization domain 130, the clock synchronization domain 130 includes clock synchronization domain 0 to clock synchronization domain N, and the master clock synchronization device 100, the standby clock synchronization device 110 and slave clock synchronization devices 120 are determined; the master clock synchronization device and standby clock synchronization device keep a clock synchronization handshake message, and the master clock synchronization device 100 periodically synchronizes clocks to the standby clock synchronization device 110 and the slave clock synchronization devices 120.

The second step, in each clock synchronization domain, the master and standby clock synchronization devices are determined through competition after the system is powered on; competition for the master and standby clock synchronization devices is determined by taking the load of each core system into consideration, i.e., the core with the lowest load is used as the master clock synchronization device, the core with the second lowest load is used as the standby clock synchronization device, and other cores are used as slave clock synchronization devices; clock synchronization domains are also divided into master and slave clock synchronization domains, and the clock synchronization domain having the master clock synchronization device with a lowest load among all clock synchronization domains is used as a master clock synchronization domain, which can exteriorly connect with an exterior synchronization device such as a high-accuracy RTC clock, a high-accuracy GPS clock or a high-accuracy oscillator, as a reference frame of the whole clock synchronization system. When calculating the load of the core, the associated factors to be considered include but not limited to, current occupancy rate of a core, core load history, type of an articulated interrupt device of a core, a number of articulated interrupt sources of a core and type of application of a core, and the load of the core is obtained by accumulating one or more of these factors multiplied with a certain weighted coefficient.

The master clock synchronization device in the master clock synchronization domain periodically samples the loads of the master clock synchronization devices in the slave clock synchronization domains, and takes an arithmetic mean of the loads in the latest N (N is an integer) times of all master clock synchronization devices, wherein the value of N determines the sensitivity to load change. If the master clock synchronization device with the lowest load currently is not consistent with the master clock synchronization device in the master clock synchronization domain, then the master clock synchronization domain is switched to the clock synchronization domain in which the master clock synchronization device with the lowest load is, and the current master clock synchronization domain is converted into a slave clock synchronization domain; in order to avoid frequent switching of the master clock synchronization domain caused by load change, the master clock synchronization domain can be configured to have a protection time interval T1 (seconds), during which the master clock synchronization domain is forbidden to switch again; similarly, in each clock synchronization domain, the master clock synchronization device is responsible for calculating the arithmetic mean of loads in the latest M (M is an integer) times of all clock synchronization devices in the clock synchronization domain, wherein the value of M determines the sensitivity to load change; the clock synchronization device with the lowest load in the clock synchronization domain is selected as the master clock synchronization device, and the master clock synchronization device may be configured to have a protection time interval T2 (seconds), during which the master clock synchronization device in the clock synchronization domain is forbidden to switch again; furthermore, the clock synchronization device with the lowest load in the clock synchronization domain may be selected as the standby clock synchronization device after the calculation of the arithmetic mean of loads, and afterwards the standby clock synchronization device is switched to a master clock synchronization device by way of master-standby switch, which can make the change of the master clock synchronization device more smooth.

The third step, in each clock synchronization domain, the master clock synchronization device periodically synchronizes clocks to the slave clock synchronization devices (including the standby clock synchronization device); additionally, the master and standby clock synchronization devices periodically send a handshake message, and if the current core load of the master clock synchronization device is higher than that of the standby clock synchronization device, or the master clock synchronization device is abnormal, then the standby clock synchronization device becomes the master clock synchronization device, the original master clock synchronization device is converted to a standby clock synchronization device, and a master-standby switch message is sent to the master clock synchronization domain when master-standby switch occurs. In order to avoid possible frequent occurrences of master-standby switch, a master-standby switch protection time interval T3 (seconds) is configured for forbidding switching again between the master and standby clock synchronization devices in the clock synchronization domain during this time interval.

Figure 4:
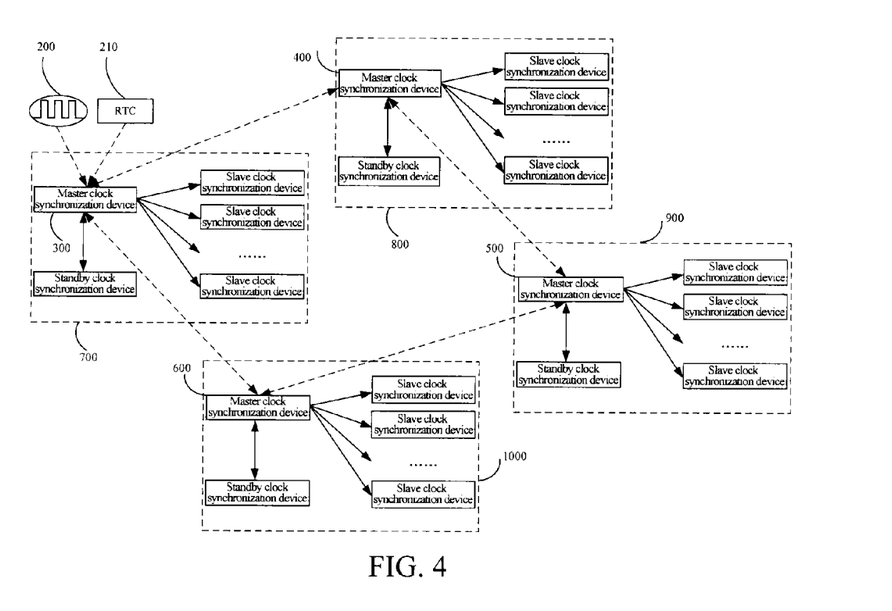
FIG. 4 illustrates clock tick monitoring according to a specific embodiment of the present invention.

The fourth step, all of the clock synchronization domains can be constructed into an annular synchronization network, the master clock synchronization domain is used as a controlling and managing domain for all clock synchronization domains and periodically sends a synchronization deviation detection message. The information of each other clock synchronization domain should be registered to the master clock synchronization domain after each clock synchronization domain is established and then added to a synchronization linked list of the annular network in a sequence of registration; the registration information includes information about master and standby clock synchronization devices in the clock synchronization domain, and the synchronization deviation detection message is transmitted sequentially in the synchronization linked list; as shown in FIG. 4, the master clock synchronization device 300 in the master clock synchronization domain 700 obtains the current standard time of the system through a high-accuracy real-time clock 210, or obtains the clock accuracy required by synchronization through an exterior oscillator counter 200. The master clock synchronization device 300 in the master clock synchronization domain 700, the master clock synchronization device 400 in the slave lock synchronization domain 800, the master clock synchronization device 500 in the slave clock synchronization domain 900, and the master clock synchronization device 600 in the slave clock synchronization domain 1000 implement synchronization between master clock synchronization devices in each clock synchronization domain through constructing an annular synchronization network, the master clock synchronization device 300 sends a synchronization deviation detection message, which passes through the master clock synchronization device 400, master clock synchronization device 500 and master clock synchronization device 600 in sequence according to the annular flow direction and finally returns to the master clock synchronization device 300, each master clock synchronization device returns its own time deviation to the synchronization deviation detection message, the master clock synchronization device 300 detects the time deviation of each master clock synchronization device in other clock synchronization domains carried in the synchronization deviation detection message and determines whether the deviation of the whole clock synchronization system is within an allowed range.

The fifth step, when the synchronization deviation detection message passes through the master clock synchronization devices in sequence according to the annular flow direction, it is assumed that the number of cores of the master clock synchronization devices which the message passes through is L, the current clock of each master clock synchronization device is recorded in the synchronization deviation detection message, and since the boot-up time for activating each core is unnecessarily the same, various master clock synchronization devices should not be compared according to the absolute number of clock ticks, instead, the various master clock synchronization devices should be compared in terms of relative time interval. The method for calculating each time synchronization deviation is as follows: the current clock tick of the master clock synchronization device in each clock synchronization domain is recorded in sequence in the flow direction of the synchronization deviation detection message, the time deviation of the current master clock synchronization device relative to the previous master clock synchronization device in the flow direction is $\Delta T_n$ (n=0, 1, ..., L-1), $\Delta T_n = T_n - T_{n-1}$, wherein L is the number of master clock synchronization devices, and $T_n$ is the current system clock tick of the $n^{th}$ master clock synchronization device in the flow direction of the synchronization deviation detection message. It is started to calculate the clock deviation when the synchronization deviation detection message is sent for the second time.

The sixth step, when the synchronization deviation detection message returns to the master clock synchronization domain, the deviation value of each clock synchronization domain from the master clock synchronization domain 700 is calculated, and when the deviation value is greater than a permitted error, the master clock synchronization device 300 of the master clock synchronization domain 700 needs to modify the master clock synchronization devices of all master clock synchronization domains, the master clock synchronization device 300 releases the modified time, and the adjustment quantity required by the master clock synchronization device of each clock synchronization domain is carried in the next synchronization deviation detection message.

The seventh step, weighted averaging is performed on the absolute value of the adjustment quantity of each clock synchronization domain for a number of times in a predetermined range, for example, the priority level of the clock synchronization domain can be determined based on five calculation results of the absolute value of the adjustment quantity, the smaller the value of the calculation result of the absolute value of the adjustment quantity is, the higher the requirement on the time accuracy is. The priority level of the clock synchronization domain is positive correlated with the time accuracy, i.e., the higher the requirement on time accuracy is, the higher the priority level is. When the clock accuracy required by a core application changes or a new core application is activated, each clock synchronization device may be adjusted between different clock synchronization domains if necessary; for example, a group of core applications that are not sensitive to time accuracy is allocated to a clock synchronization domain with a lower priority level, and a group of core applications that have high requirements on time accuracy is allocated to a clock synchronization domain with a higher priority level. When the clock synchronization devices in the system increase, for example when a new core needs to be activated due to increase of load in the system, the core application and its requirement on clock accuracy are considered, then it is allocated to the existing clock synchronization domain with the corresponding level as a slave clock synchronization device, and when the number of cores to be activated exceeds a threshold for the clock synchronization devices that can be contained by the clock synchronization domain with this level, the clock synchronization domain with the corresponding level may be divided and a message is sent to the master clock synchronization domain so that the master and standby clock synchronization devices in the clock synchronization domain are used as the master clock synchronization devices of the two clock synchronization domains respectively. The standby clock synchronization device in the new clock synchronization domain is selected through new competition in the new clock synchronization domain, and a registration message is sent to the master clock synchronization domain, which can effectively avoid an error caused by expansion of the scale of the system.

Figure 5:
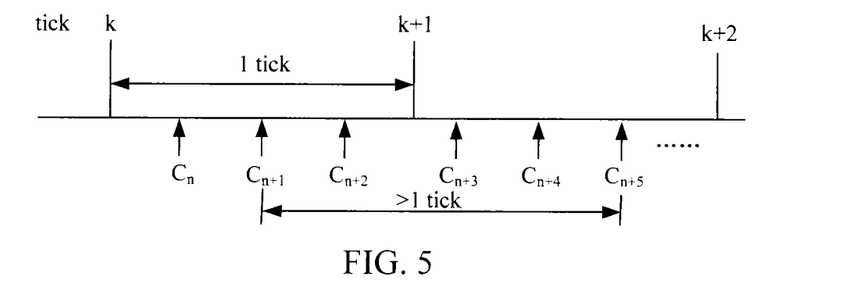
FIG. 5 is a flow chart of the time synchronization method in a multi-core system according to a specific embodiment of the present invention.

The eighth step, the master clock synchronization device in the master clock synchronization domain monitors whether the system clock tick increases correctly, ensures that the numbers of ticks of the operating system operated on the core are sampled for more than two times at least within each tick interval, monitors the tick accumulated value, and immediately modifies if it finds that the tick of the master clock synchronization device of the master clock synchronization domain is lost; the principle for loss judgment is as shown in FIG. 5, wherein sampling should be made for more than two times in each tick interval, and when the sampling interval exceeds the accumulated interval of one tick, then it can be confirmed that the tick is lost, for example, tick is sampled as k at the time of $C_{n+1}$, and considering the software or delay error of the interrupt, whether the current tick is lost or not is not confirmed at the times of $C_{n+3}$ and $C_{n+4}$, only the sampled value of the current tick is recorded; when sampling is made at the time of $C_{n+5}$, the interval between $C_{n+5}$ and $C_{n+1}$ is longer than one tick, it is confirmed that the tick is lost if the monitored tick value still does not increase, and then the tick value of the current master clock synchronization device is modified.

The time synchronization system according to a specific embodiment of the present invention comprises at least one clock synchronization domain, wherein, each core in the multi-core system is respectively allocated to each clock synchronization domain, a core with a lowest load in each clock synchronization domain is selected as a master clock synchronization device in the clock synchronization domain, and other cores as slave clock synchronization devices in the clock synchronization domain; the clock synchronization domain having the master clock synchronization device with a lowest load among various master clock synchronization devices is selected as a master clock synchronization domain, while other clock synchronization domains being selected as slave clock synchronization domains;

The master clock synchronization domain is used to send a synchronization deviation detection message to each slave clock synchronization domain, and calculate a time deviation value between each slave clock synchronization domain and the master clock synchronization domain, and when the time deviation value is greater than a permitted deviation value, the master clock synchronization domain calculates a time adjustment quantity of each slave clock synchronization domain and releases the time adjustment value to each slave clock synchronization domain.

In the present invention, a master clock synchronization domain is used as a controlling and managing domain for all clock synchronization domains, therefore processing load of the system can be balanced, thereby avoiding processing delay of the system software caused by expansion of the operating scale, and the deviation of an upper-layer software timer caused by increase of operating time of the system can be periodically adjusted, thus effectively achieving clock synchronization of the multi-core system and improving the reliability and stability of system operation.

The above content is provided for further describing the present invention in detail with reference to the specific preferred embodiments and shall not be construed as limiting the specific embodiments of the present invention thereto. A person having ordinary skill in the art can make several simple deductions or replacements without departing from the idea of the present invention, and these deductions or replacements should be considered as within the protection scope of the present invention.

INDUSTRIAL APPLICABILITY

In the present invention, time synchronization domains are divided in a multi-core system, a master clock synchronization domain is used as a controlling and managing domain for all clock synchronization domains, therefore processing load of the system can be balanced, thereby avoiding processing delay of the system software caused by expansion of the operating scale, and the deviation of an upper-layer software timer caused by increase of operating time of the system is adjusted, thus effectively achieving clock synchronization of the multi-core system and improving the reliability and stability of system operation.

What is claimed is:

1. A time synchronization method for a multi-core system, comprising the following steps of:

A, establishing at least one clock synchronization domain, and respectively allocating each core of the multi-core system to each clock synchronization domain;

B, selecting a core with a lowest load in each clock synchronization domain as a master clock synchronization device in the clock synchronization domain, and other cores as slave clock synchronization devices in the clock synchronization domain; selecting the clock synchronization domain having the master clock synchronization device with a lowest load among various master clock synchronization devices as a master clock synchronization domain, while other clock synchronization domains being selected as slave cock synchronization domains;

C, the master clock synchronization domain sending a synchronization deviation detection message to each slave clock synchronization domain, and calculating a time deviation value between each slave clock synchronization domain and the master clock synchronization domain;

D, when the time deviation value is greater than a permitted deviation value, the master clock synchronization domain calculating a time adjustment quantity of each slave clock synchronization domain and releasing the time adjustment value to each slave clock synchronization domain, and each slave clock synchronization domain making adjustment based on the time adjustment quantity thereof, thereby completing clock synchronization;

wherein, said step C further comprises the following steps of:

C1, constructing the master clock synchronization domain and each slave clock synchronization domain into an annular synchronization network, and each slave clock synchronization domain registering at the master clock synchronization domain;

C2, the master clock synchronization domain sending the synchronization deviation detection message, the synchronization deviation detection message flowing through each clock synchronization domain in a sequence of registering of each clock synchronization domain and then returning to the master clock synchronization domain, and each slave clock synchronization domain returning a relative time deviation thereof to the synchronization deviation detection message, wherein the relative time deviation refers to a time deviation of each slave clock synchronization domain relative to a last slave clock synchronization domain in a flow direction of the synchronization deviation detection message;

C3, the master clock synchronization domain calculating a time deviation value between each slave clock synchronization domain and the master clock synchronization domain according to the returned synchronization deviation detection message.

2. The time synchronization method according to claim 1, wherein, said step B further comprises the following steps of:

selecting a core with a second lowest load in each clock synchronization domain as a standby clock synchronization device in the clock synchronization domain, and when a core load of the master clock synchronization device is higher than that of the standby clock synchronization device or the master clock synchronization device is abnormal, switching the master clock synchronization device with the standby clock synchronization device.

3. The time synchronization method according to claim 2, further comprising system clock tick monitoring processing:

the master time synchronization device of the master time synchronization domain at least sampling system ticks twice during each system tick interval, and accumulating sampling values of system ticks;

judging whether system ticks are lost according to a predetermined principle, and if yes, modifying a current system tick value.

4. The time synchronization method according to claim 1, wherein in said step C, the master clock synchronization domain sends the synchronization deviation detection message to each slave clock synchronization domain in a periodical manner.

5. The time synchronization method according to claim 4, further comprising system clock tick monitoring processing:

the master time synchronization device of the master time synchronization domain at least sampling system ticks twice during each system tick interval, and accumulating sampling values of system ticks;

judging whether system ticks are lost according to a predetermined principle, and if yes, modifying a current system tick value.

6. The time synchronization method according to claim 1, wherein the adjusting step in said step D further comprises:
   weighted averaging an absolute value of the time adjustment quantity of each slave clock synchronization domain for a number of times in a predetermined range;
   determining a priority level of each slave clock synchronization domain according to a result of the weighted averaging; and
   allowing each slave clock synchronization device to adjust among each slave clock synchronization domain according to time accuracy of a core application, adjusting a slave clock synchronization device having a high requirement on time accuracy to a slave clock synchronization domain with a high priority level, and adjusting a slave clock synchronization device having a low requirement on time accuracy to a slave clock synchronization domain with a low priority level.

7. The time synchronization method according to claim 6, further comprising the following steps of:
   if any core is newly added, adding the newly added core to a clock synchronization domain with a corresponding priority level, and if a number of newly added cores is greater than a device accommodating threshold of a time clock synchronization domain with a corresponding priority level, then splitting the clock synchronization domain.

8. The time synchronization method according to claim 7, further comprising system clock tick monitoring processing:
   the master time synchronization device of the master time synchronization domain at least sampling system ticks twice during each system tick interval, and accumulating sampling values of system ticks;
   judging whether system ticks are lost according to a predetermined principle, and if yes, modifying a current system tick value.

9. The time synchronization method according to claim 6, further comprising system clock tick monitoring processing:
   the master time synchronization device of the master time synchronization domain at least sampling system ticks twice during each system tick interval, and accumulating sampling values of system ticks;
   judging whether system ticks are lost according to a predetermined principle, and if yes, modifying a current system tick value.

10. The time synchronization method according to claim 1, wherein the load of a core is calculated as follows:
    determining core load calculation associated factors, said core load calculation associated factors comprising current occupancy rate of the core, core load history, type of an articulated interrupt device of the core, a number of articulated interrupt sources of the core and type of application of the core; and
    selecting at least one of the core load calculation associated factors for weighted operation, and using a result of the weighted operation as the load of the core.

11. The time synchronization method according to claim 10, further comprising system clock tick monitoring processing:
    the master time synchronization device of the master time synchronization domain at least sampling system ticks twice during each system tick interval, and accumulating sampling values of system ticks;
    judging whether system ticks are lost according to a predetermined principle, and if yes, modifying a current system tick value.

12. The time synchronization method according to claim 1, further comprising system clock tick monitoring processing:
    the master time synchronization device of the master time synchronization domain at least sampling system ticks twice during each system tick interval, and accumulating sampling values of system ticks;
    judging whether system ticks are lost according to a predetermined principle, and if yes, modifying a current system tick value.

13. A time synchronization system for a multi-core system, comprising at least one clock synchronization domain, wherein the time synchronization system is configured as follows:
    each core in the multi-core system being allocated respectively to each clock synchronization domain, a core with a lowest load in each clock synchronization domain being selected as a master clock synchronization device in the clock synchronization domain, and other cores being selected as slave clock synchronization devices in the clock synchronization domain; the clock synchronization domain having the master clock synchronization device with a lowest load among various master clock synchronization devices being selected as a master clock synchronization domain, while other clock synchronization domains being selected as slave clock synchronization domains;
    the master clock synchronization domain sending a synchronization deviation detection message to each slave clock synchronization domain, and calculating a time deviation value between each slave clock synchronization domain and the master clock synchronization domain, and when the time deviation value is greater than a permitted deviation value, the master clock synchronization domain calculating a time adjustment quantity of each slave clock synchronization domain and releasing the time adjustment value to each slave clock synchronization domain;
    wherein, operations of the master clock synchronization domain sending a synchronization deviation detection message to each slave clock synchronization domain and calculating a time deviation value between each slave clock synchronization domain and the master clock synchronization domain comprise the following steps:
    constructing the master clock synchronization domain and each slave clock synchronization domain into an annular synchronization network, and each slave clock synchronization domain registering at the master clock synchronization domain;
    the master clock synchronization domain sending the synchronization deviation detection message, the synchronization deviation detection message flowing through each clock synchronization domain in a sequence of registering of each clock synchronization domain and then returning to the master clock synchronization domain, and each slave clock synchronization domain returning a relative time deviation thereof to the synchronization deviation detection message, wherein the relative time deviation refers to a time deviation of each slave clock synchronization domain relative to a last slave clock synchronization domain in a flow direction of the synchronization deviation detection message;

the master clock synchronization domain calculating a time deviation value between each slave clock synchronization domain and the master clock synchronization domain according to the returned synchronization deviation detection message.

14. The time synchronization system according to claim 13, wherein, the master clock synchronization domain is exteriorly connected with an exterior synchronization source.

* * * * *